Aug. 16, 1955  O. H. SCHUCK  2,715,703
REMOTE DIGITAL CONTROLLERS
Filed June 29, 1950  3 Sheets-Sheet 1
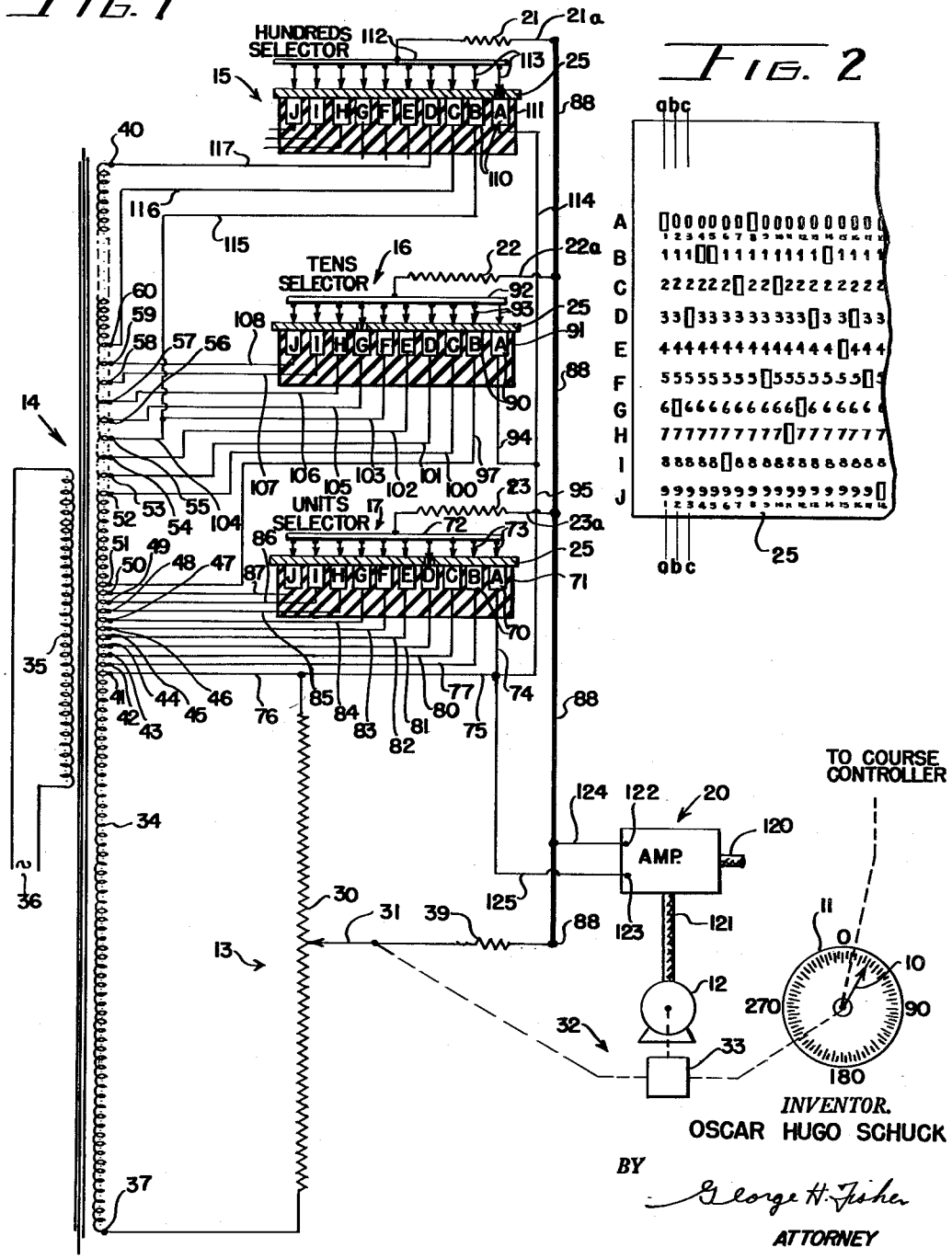
INVENTOR.
OSCAR HUGO SCHUCK
BY
George H. Fisher
ATTORNEY

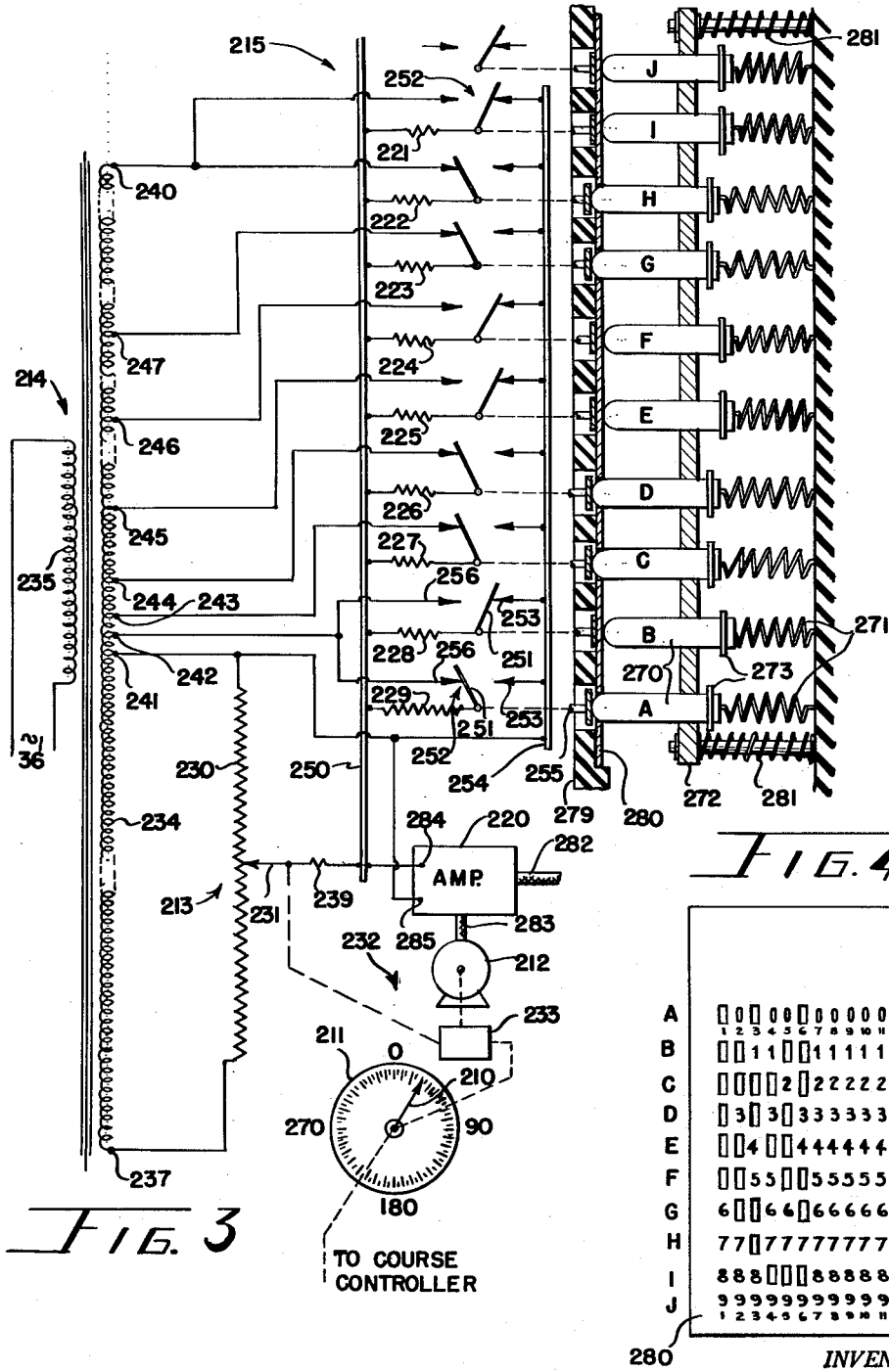

Aug. 16, 1955  O. H. SCHUCK  2,715,703
REMOTE DIGITAL CONTROLLERS
Filed June 29, 1950  3 Sheets-Sheet 3
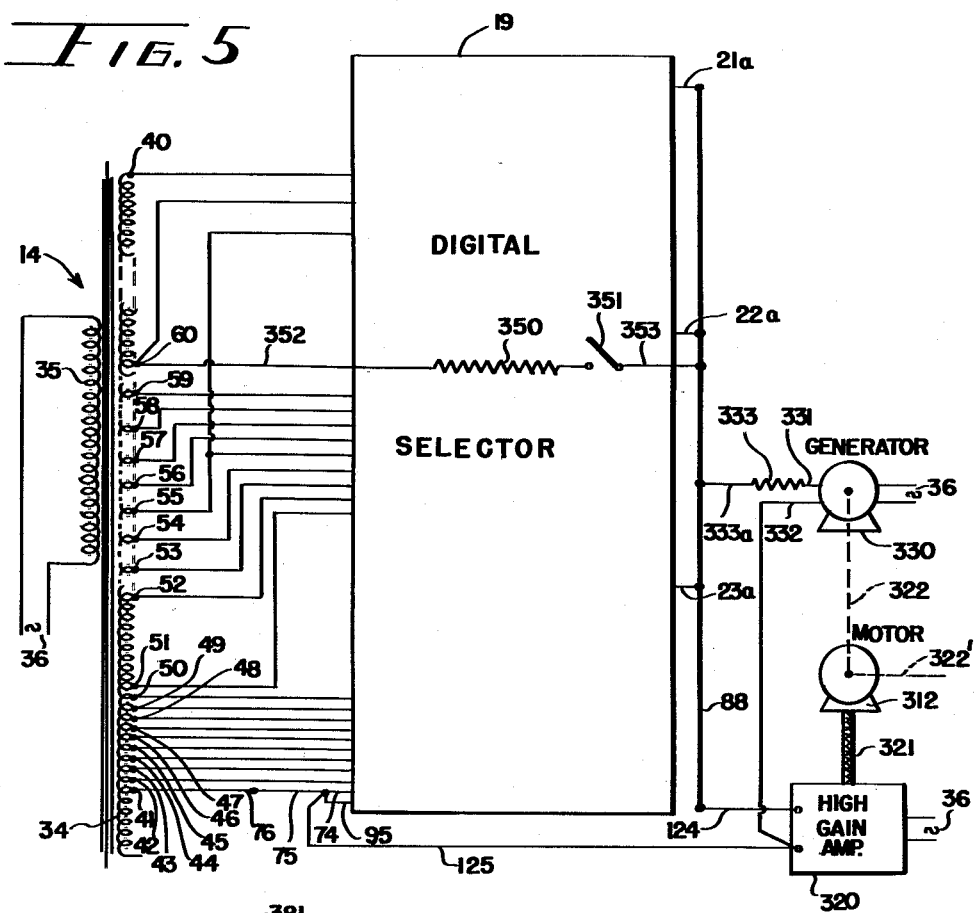
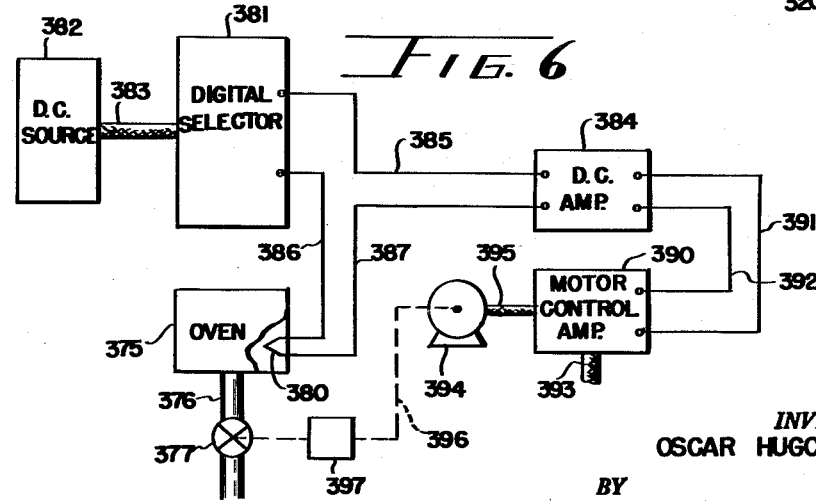
INVENTOR.
OSCAR HUGO SCHUCK
BY
George H. Fisher
ATTORNEY.

United States Patent Office 2,715,703
Patented Aug. 16, 1955

2,715,703

REMOTE DIGITAL CONTROLLERS

Oscar Hugo Schuck, Minneapolis, Minn., assignor to Minneapolis-Honeywell Regulator Company, Minneapolis, Minn., a corporation of Delaware Application June 29, 1950, Serial No. 170,971

3 Claims. (Cl. 318—28)

This invention relates to the field of motor control apparatus. In the control arts it is frequently desired to control the operation of an electric motor in accordance with a desired variable. The variable may be a physical condition such as temperature, a desired position, or a desired speed, or it may be the error between selected and actual values of the condition. The invention is particularly adapted to automatic adjustment of course control means in the automatic pilot of an aircraft proceeding in a flight made up of a series of differently directed sections, and will be described in most detail in this environment, but other applications of the principle come within the scope of the invention and certain of these will also be described and claimed.

In course control apparatus it is conventional to provide a position selector coordinated with the member to be positioned, so that changing the position of the selector energizes a motor to bring about a like change in the position of the member. In such arrangements, however, there is a 1:1 or $n$:1 relation between the desired change in the position of the member and the amount of change required to be made at the selector.

The present invention departs from former structures at this point. As far as the selector of the present invention is concerned, no concept of position is involved, but rather the concept of number as in an adding machine. Each of a series of positions which the member to be controlled may assume is assigned one of a series of numbers, and the function of the position selector accordingly becomes only that of selecting an abstract number, which is subsequently converted to position by operation of the apparatus.

An object of the invention is therefore to provide means converting an abstract number into a position to which the number has been assigned.

A further object of the invention is to provide means severally adjustable in accordance with the values of the several digits of a number, and means actuated thereby for adjusting a member to be controlled into the position to which the number has been assigned.

A more specific object of the invention is to provide apparatus as just described in which the number is expressed in the decimal system.

A further specific object of the invention is to provide apparatus as just described in which the number is expressed in the binary system.

Another object of the invention is to provide apparatus as described above in which each selected number is represented by perforate and imperforate portions of a record card in accordance with conventional "punched card" technology.

Yet another object of the invention is to provide apparatus as just described, in which each number is represented by a single punching in each of as many columns on the card as there are digits in the number.

Yet another object of the invention is to provide apparatus as just described, but with each number represented by a plurality of perforate and imperforate portions of a single column of the card, whereby several times as many numbers may be recorded on a single card.

A more general object of the invention is to provide means controlling the operation of a motor in accordance with a control device whose operation is based on abstract numbers.

A further object of the invention is to provide means controlling the speed of a motor in accordance with a control device whose operation is based on abstract numbers.

A further object of the invention is to provide means controlling the amount of rotation of a motor in accordance with a control device whose operation is based on abstract numbers.

Another general object of the invention is to provide means controlling a condition in accordance with a control device whose operation is based on abstract numbers.

A still further specific object of the invention is to provide means severally adjustable in accordance with the final digits of a number whose initial digit remains the same, together with means presettable in accordance with the value of the initial digit, and means actuated thereby for adjusting a member to be controlled in accordance with the condition to which the number has been assigned.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

In the drawing:

Figure 1 is a schematic showing of a first embodiment of the invention, in which the position identifying numbers are expressed in the decimal system, and in which the functions of perforation sensing and circuit closing are combined;

Figure 2 is a fragmentary view of a punched card suitable for use in the apparatus of Figure 1;

Figure 3 is a schematic showing of a second embodiment of the invention, in which the position identifying members are expressed in the binary system, and in which the functions of perforation sensing and circuit closing are separated;

Figure 4 is a fragmentary view of a punched card suitable for use in the apparatus of Figure 3;

Figure 5 is a schematic showing of apparatus for controlling the speed of a motor in accordance with the digits of an abstract number; and Figure 6 is a schematic showing of apparatus for controlling a condition in accordance with the digits of an abstract number.

Structure of Figure 1

In Figure 1 the member to be adjusted is shown as comprising an index 10, capable of rotation with respect to a circular scale 11, graduated from 0 to 359 degrees. Index 10 is adjusted by a motor 12, which also adjusts a voltage divider 13. Voltage divider 13 is energized from a transformer 14, which also energizes a hundreds selector 15, a tens selector 16, and a unit selector 17. The selectors and the voltage divider energizes an amplifier 20 through summing resistors 21, 22, 23, and 39 respectively, and amplifier 20 controls the operation of motor 12. Operation of selectors 15, 16, and 17 takes place under the control of a punched card 25.

Voltage divider 13 comprises a resistance winding 30 and a movable contact 31 which may be displaced therealong while remaining in electrical contact therewith. Motor 12 drives slider 31, and index 10, through a mechanical connection 32 which may include suitable reduction gearing 33 if necessary. The relationship between voltage divider 13 and index 10 is such that when the index is at 0 on scale 11, slider 31 is at the upper end of winding 30, while when index 10 is at 359 on scale 11, slider 31 is at the bottom end of winding 30.

Winding 30 of voltage divider 13 is energized from the secondary winding 34 of transformer 14 whose primary winding 35 is energized from a suitable source 36 of alternating voltage of a selected frequency. Secondary winding 34 has a pair of terminals 37 and 40, and a plurality of intermediate taps, 41, 42, 43, 44, 45, 46, 47, 48, 49, 50, 51, 52, 53, 54, 55, 56, 57, 58, 59, and 60.

The relative magnitudes of the voltages supplied at the various taps of secondary winding 34 are significant in connection with the present invention, and in defining them the potential at terminal 41 will be considered 0, voltages having the same phase as that between tap 41 and terminal 40 will be considered positive, and the unit of voltage will be that between taps 41 and 42. The voltages may now be tabulated as follows:

| Point | Voltage, units |
| --- | --- |
| 37 | −120 |
| 40 | +150 |
| 41 | 0 |
| 42 | +1 |
| 43 | 2 |
| 44 | 3 |
| 45 | 4 |
| 46 | 5 |
| 47 | 6 |
| 48 | 7 |
| 49 | 8 |
| 50 | 9 |
| 51 | 10 |
| 52 | 20 |
| 53 | 30 |
| 54 | 40 |
| 55 | 50 |
| 56 | 60 |
| 57 | 70 |
| 58 | 80 |
| 59 | 90 |
| 60 | 100 |

Some attempt has been made in Figure 1 to suggest relative voltage magnitudes by the spacing between the taps on winding 34. It will be appreciated that direct current sources may be substituted for the tapped secondary winding, if this is desired.

Fig. 2 shows in detail the nature of card 25, which is used to control motor 12 through selectors 15, 16, and 17. This is a conventional record card, provided with eighty columns of ten spaces each, numbered from 0 to 9. In use, one space in each column is perforated, and the location of the perforation represents one of the ten Arabic numerals. As many columns are used as there are digits in the largest number to be handled by the card. Thus, where any number between 0 and 359 may be used, as in working with angular positions in degrees, three columns must be punched, one for the hundreds digit, one for the tens digit, and one for the units digit. For numbers less than 100 the 0 position of the hundreds column must be punched, and for numbers less than 10 the 0 position of the tens column must also be punched.

By way of illustration, the first six sets of three columns have been indicated in Figure 2 as being perforated or punched to represent the numbers 63 (063), 118, 205, 276, 314, and 359. The horizontal rows have been given reference letters A, B, C, etc. in Figure 2, and the same reference letters are used in Figure 1.

Selectors 15, 16, and 17 of Figure 1 are arranged to cooperate with the first, second, and third columns of card 25, as indicated by the section lines a—a, b—b, and c—c in Figure 2. Thus, selector 17 is shown to comprise ten fixed contacts 70 molded into or otherwise supported by an insulating member 71, in such relative position as to be aligned with the positions of all possible perforations in the third column, c of card 25.

Spaced from and parallel to members 71 is a contact bar 72 carrying ten contact fingers 73, each of which is aligned with one of fixed contacts 70, so that when any of the positions in column c, of the card is perforated, the finger and the fixed contact associated with that position make electrical connection.

Fixed contact 70A is connected to tap 41 by conductors 74, 75, and 76. Similarly, fixed contacts 70B, 70C, 70D, 70E, 70F, 70G, 70H, 70I, and 70J are connected to taps 42, 43, 44, 45, 46, 47, 48, 49, and 50 by conductors 77, 80, 81, 82, 83, 84, 85, 86, and 87, respectively. Contact finger 73D is shown as engaging fixed contact 70D, so that a voltage of three units appears between contact bar 72 and tap 41. This voltage is supplied to a summing bus 88 through summing resistor 23.

Selector 16 is shown to comprise ten fixed contacts 90 molded into or otherwise supported by an insulating member 91, in such relative positions as to be aligned with perforations in the second column, b, of card 25. Spaced from and parallel to member 91 is a second contact bar 92 carrying ten contact fingers 93, each of which is aligned with one of fixed contacts 90 so that when any of the positions in column b of the card is perforated, the finger and fixed contact associated with that position make electrical connection.

Fixed contact 90A is connected to tap 41 by conductors 94, 95, 75, and 76. Similarly fixed contacts 90B, 90C, 90D, 90E, 90F, 90G, 90H, 90I, and 90J are connected to taps 51, 52, 53, 54, 55, 56, 57, 58, and 59 by conductors 97, 100, 101, 102, 103 and 104, 105, 106, 107, and 108. Contact finger 93G is shown engaging fixed contact 90G, so that a voltage of 60 units appears between contact bar 92 and tap 41. This voltage is supplied to summing bus 88 through summing resistor 22.

Selector 15 is shown to comprise ten fixed contacts 110 molded into or otherwise supported by an insulating member 111, in such relative positions as to be aligned with perforations in the first column, a, of card 25. Spaced from and parallel to member 111 is a contact bar 112, carrying ten contact fingers 113, each of which is aligned with one of fixed contacts 110 so that when any of the positions in column a of the card is perforated, the finger and the fixed contact associated with that position make electrical connection.

It will be appreciated that members 71, 91, and 111 may in fact be a unitary block, which moreover may extend the full length of card 25, and thus support 800 fixed contacts.

Fixed contact 110A is connected to tap 41 by conductors 114, 95, 75, and 76. Similarly fixed contact 110B is connected to tap 55 by conductors 115 and 104, fixed contact 110C is connected to tap 60 by conductor 116, and fixed contact 110D is connected to terminal 40 by conductor 117. Since no number larger than 359 is to be used, fixed contacts 110E, 110F, 110G, 110H, 110I, and 110J are not energized.

It should also be pointed out that as many columns of perforations as represent units on the same scale may be energized from taps 41 to 50 and terminal 40 of transformer 14, and that as many fixed contacts representing tens and hundreds respectively can be energized from the second and third sets of taps on the transformer. However, each set of three contact bars must be connected to a separate summing bus for controlling a separate positioning motor to adjust a separate voltage divider, thus comprising an independent proportioning apparatus controlled from the same card. The present disclosure shows the equipment related only to one three-digit number, namely, that represented by the punchings in columns a, b, and c of card 25. On the other hand, an unlimited succession of cards 25, each with different punchings in its first three columns, may be used to control the operation of motor 12 through selectors 15, 16, and 17 in any desired sequence.

Contact finger 113A is shown as engaging fixed contact 110A, so that no voltage appears between contact bar 112 and tap 41. Bar 112 is connected to summing bus 88 through summing resistor 21.

Slider 31 of voltage divider 13 is connected to summing bus 88 through summing resistor 39. Resistor 39 is of one-third the resistance, and resistor 21 is of one-half the resistance, of resistors 22 and 23.

Amplifier 20 is shown to comprise a power connection 120, an output cable 121, and a pair of input terminals 122 and 123. Summing bus 88 is connected to input terminal 122 by conductor 124, and input terminal 123 is connected to tap 41 of secondary winding 34 by conductors 125, 75, and 76.

The principles of parallel summing of voltages are so well known as not to require detailed consideration here. The voltage between input terminals 122 and 123 of amplifier 120 is approximately equal to the sum of the voltages which would be produced independently on summing bus 88 by each of the voltages on contact bars 72, 92 or 112, or slider 31, with all of the others connected to tap 41. The individual voltages thus produced depend upon the magnitude of the voltage at each contact bar and upon the magnitude of the summing resistor connecting that contact bar to the summing bus. When the sum of these voltages is zero, amplifier 20 provides no output to motor 12, which remains stationary. When the sum of these voltages is not zero, amplifier 20 provides an output on cable 121 to motor 12, which causes operation of the motor in one direction or the other, depending on whether the sum of the voltages on the contact bars is greater or less than the voltage on slider 31. Operation of the motor adjusts the position of slider 31 in such a fashion as to make the voltage thereon negatively equal to the sum of the voltages on the contact bars. When this condition is reached, energization of motor 12 again ceases. Such motor and amplifier combinations are well known in the art, and need not be discussed at length here.

If contact finger 73C engages fixed contact 70C, a voltage of two units appears on contact bar 72, measured with respect to tap 41. If contact finger 93C engages fixed contact 90C, a voltage of twenty units appears between contact bar 92 and tap 41. If contact finger 113C engages fixed contact 110C, a voltage not of 200 units but of 100 units appears between contact bar 112 and tap 41. This change in the constant of proportionality however is compensated for by the changed relationship between summing resistor 21 and summing resistors 22 and 23: when the resistance of a summing resistor is cut in half, only half as much voltage is required to produce the same effect at summing bus 88. In the same way only 120 voltage units need be impressed across winding 30 of voltage divider 13 to give the effect of 360 voltage units on the scale of selectors 16 and 17, because the resistance of summing resistor 39 is only one third that of summing resistors 22 and 23. The advantage of this arrangement is that it avoids the necessity for providing large voltages on contacts as closely spaced as they must be if commercial punched cards are to be used.

*Operation of Figure 1*

The operation of this embodiment of the invention will now be apparent. It being desired to indicate on scale 11 by means of index 10, a series of angular positions, such for example as the headings called for in successive sections of the flight of an aircraft, a series of cards similar to card 25 is prepared, each card bearing in the first three columns perforations representing one of the angular positions to which index 10 is to be positioned. These cards are passed in sequence between members 71, 91 and 111, and contact bars 72, 92, and 112, and each card causes the appearance of voltages on contact bars 72, 92, and 112, in accordance with the numerical value of the units, tens, and hundreds digits in the number in question. Amplifier 20 accordingly energizes motor 12 to position index 10 with respect to scale 11, and simultaneously to adjust slider 31 with respect to winding 30, until the input to amplifier 20 is in each case zero. This operation takes place anew each time a card is replaced. The apparatus thus provides means continuously indicating position called for by the punchings in successive cards, and it will be appreciated that the function of the apparatus is not limited to indication, but may be used for positional control wherever a motor 12 may be used for that purpose.

For most applications, the modification of the invention just described is very satisfactory. A motor, an amplifier, a voltage divider, and a set of selectors may be provided for each set of three columns on the card, so that 26 full sets of three digit numbers may be handled by a single card. However, it occasionally happens that simultaneous indication or control in accordance with 26 separate positions is not sufficient for the needs of a complicated apparatus, and in such cases it is necessary to resort to expedients such as simultaneous feeding of two cards through two sets of apparatus such as that shown, which requires duplication of the selector assembly, a rather costly alternative. To avoid this the modification of the invention shown in Figure 3 has been devised, by means of which any of the numbers represented in three columns of Figure 2 may be represented in a single column of Figure 4. As a matter of fact, the largest number capable of being represented in three columns of Figure 2 is 999, while the largest number capable of being represented in a single column of Figure 4 is 1023.

The apparatus of Figures 1 and 2 is based on the decimal system, in which any number is actually a polynomial in decreasing powers of ten, the numerals being in effect the coefficients of the various powers of ten in the polynomial expression. Thus, the number 205 in the decimal system is really a shorthand way of writing the following expression:

$$2 \times 10^2 + 0 \times 10^1 + 5 \times 10^0$$

The apparatus of Figures 3 and 4 on the other hand is based on the binary system, where 2 rather than 10 is the number whose decreasing powers are represented in the polynomial. By way of comparison, the same quantity of units which is represented by the number 205 in the decimal system, is represented in the binary system by the number 11001101: this may be re-expressed as a polynomial, as follows:

$$1 \times 2^7 + 1 \times 2^6 + 0 \times 2^5 + 0 \times 2^4 + 1 \times 2^3 + 1 \times 2^2 + 0 \times 2^1 + 1 \times 2^0$$

It will be at once apparent that a number expressed in the binary system is much longer than the number expressed in the decimal system, but on the other hand it requires only two different numerals for each digit, namely 1 and 0, while the decimal system requires ten different numerals for each digit. The binary system is well adapted for use in computers, for example, since every digit in any number can be represented by one or the other of two conditions, and it hence presents a much simpler switching problem. Thus instead of requiring a selector of ten contacts for the units of a multidigit number, it is necessary only to have an arrangement for either supplying a voltage or interrupting the supply of a voltage. Ten digits can accordingly be represented by a single column in a recording card, and the largest ten digit number in this binary system, 1,111,111,111, which in the decimal system is 1023, is larger than the largest three digit number in the decimal system which is 999.

Apparatus for making use of the advantages of the binary system in performing the functions here desired is disclosed in Figures 3 and 4, the latter of which shows a punched card identical with the card of Figure 2, but punched according to the binary system rather than according to the decimal system.

*Structure of Figure 3*

Figure 3 shows an index 210 arranged to be positioned with respect to a fixed scale 211 by a motor 212. Motor 212 also adjusts a voltage divider 213, which is energized from a transformer 214 together with a selector 215. Motor 212 is controlled by an amplifier 220, energized from selector 215 through one or more of a plurality of summing resistors 221, 222, 223, 224, 225, 226, 227, 228, and 229, and from voltage divider 213 through summing resistor 239.

Voltage divider 13 is shown to comprise a resistance winding 230 with respect to which a slider 231 is movable by motor 212, through a mechanical connection 232 including suitable reducing gearing 233. Slider 231 is at the top of winding 230 when index 210 is at 0 on scale 211, and is at the bottom of winding 230 when index 210 is at 359 on scale 211. Transformer 214 is shown to comprise a secondary winding 234 and a primary winding 235, the latter being energized from an alternating voltage source 36. Secondary winding 234 has terminals 237 and 240 and intermediate taps 241, 242, 243, 244, 245, 246, and 247. The voltages between tap 241 and the terminal and remaining taps of secondary winding 234 may be tabulated as follows:

| Point | Voltage, units |
|---|---|
| 237 | −128 |
| 240 | +128 |
| 241 | 0 |
| 242 | 2 |
| 243 | 4 |
| 244 | 8 |
| 245 | 16 |
| 246 | 32 |
| 247 | 64 |

Summing resistors 222, 223, 224, 225, 226, 227, and 228 are all of the same resistance. Resistor 221 is of half this resistance, resistor 229 is of double this resistance, and resistor 239 is of ⅓ this resistance. One end of each of the summing resistors listed above is connected to a summing bus 250: the other ends of summing resistors 221 to 229 inclusive are connected respectively to the movable contacts 251 of a like number of single-pole single-throw switches 252. The normal condition of each of these switches, as shown in Figure 3, is that in which the movable contact engages a fixed contact 253: all fixed contacts 253 are connected to a common bus 254.

Switches 252 are operated by actuators 255, which displace movable contacts 251 to the left into engagement with a further set of fixed contacts 256. This operation disconnects the right hand ends of the summing resistors from ground bus 254, and connects them to the taps on transformer secondary winding 234. Thus, summing resistors 221 and 222 are arranged for connection to terminal 240 of secondary winding 234, resistor 223 is adapted for connection to tap 247, resistor 224 for connection to tap 246, resistor 225 for connection to tap 245, resistor 226 for connection to tap 244, resistor 227 for connection to tap 243, and resistors 228 and 229 for connection to tap 242. Tap 241 is connected to common bus 254.

Associated with each of actuators 255 is a plunger 270 urged to the left by a compression spring 271. Plungers 270 pass through orifices in a resetting plate 272, which is arranged to engage collars 273 on the plungers so that when the plate is drawn to the right, all the plungers are drawn away from actuators 255, to permit a record card 280 to be inserted into or removed from the device. When plate 272 is released, it is displaced to the left by suitable springs 281, and plungers 270 are free to engage the surface of card 280: where the card is perforated the plungers pass through the perforations and operate actuators 255. Thus, wherever the card is perforated, the associated switch 252 is actuated to the left, and summing bus 250 is energized from the appropriate tap on secondary winding 234 through the appropriate summing resistor.

Amplifier 200 is shown to have a power input 282, an output cable 283, and a pair of input terminals 284 and 285. Terminal 285 is connected to common bus 254. Terminal 284 is connected to summing bus 250.

A backing member 279, for supporting card 280, is shown as perforated in alignment with each of plungers 270, so that wherever the card is perforated the plungers may operate actuators 255, and so that where the card is not perforated sufficient support is given to the card so that no operation of the actuator results.

*Operation of Figure 3*

Assume it is desired to set index 210 at 205 on scale 211. A card 280 having a binary equivalent of 205, or 11001101, is selected and inserted against backing member 279. This operation is facilitated by displacing resetting plate 272 to the right, which draws plungers 270 out of engagement with actuators 255, and allows free insertion of the card. This card has perforations in positions A, C, D, G, and H, as shown in the third column of the card of Figure 4 and when resetting plate 272 is released, plungers A, C, D, G, and H engage their actuators, connecting summing bus 250 through summing resistors 229, 227, 226, 223, and 222 to taps to 242, 243, 244, 247, and terminal 240. The voltages supplied to summing bus 250 thereby are respectively 1, 4, 8, 64, and 128, a total of 205 volts.

If index 210 is at 205 on scale 211, a voltage of 205 volts in the opposite sense is supplied to summing bus 250 through summing resistor 239, and the input to amplifier 220 is zero. For any other position of index 210 and slider 231, a voltage of one sense or the other appears on amplifier 220 and causes operation of motor 212 to reset the index and to adjust the slider until the voltage on the amplifier is restored to zero.

Other modification of the invention thus far described will occur to those skilled in the art. Manual switches of the push button type, for example, can obviously perform the functions of the punched-card type of selector. In the apparatus of Figure 3 single pole double throw switches should be used, while in the apparatus of Figure 1 single pole single throw switches are satisfactory, but the usual interlocking means must be provided to prevent more than one switch in each decade from being closed at the same time.

A basic distinction between the structure just described and that disclosed in Figure 1 lies in the fact that in the structure of Figure 3 more than one perforation is normally encountered in each column. Thus, the decimal equivalent of the perforations in the third column of Figure 4 which is shown controlling the apparatus of Figure 3, is 205: the number is 11,001,101 in the binary system.

It must be appreciated that when the modification of the invention shown in Figures 3 and 4 is to be used, it is necessary to convert the decimal values of the positions to which index is desired to be moved into binary values, and a table of these values may of course be prepared. The only disadvantage of the arrangement is that it is not possible to read at a glance the angular position of index 210 which each card is punched to produce, since counting in the binary system is unfamiliar to most people.

Another distinction between the structures of Figure 1 and Figure 3 results from the fact that in Figure 3 the functions of switching and perforation sensing are separate. Perforation sensing is accomplished by means of plungers 270, which operate through actuators 255 to bring about the desired switching functions through separate switches 252. In the device of Figure 1 the same contact finger which passes through the perforation in the card actually complete the electric circuit in question. It will be appreciated that separation of functions can also be used with the decimal unit, if desired.

*Construction and operation of Figure 5*

Figure 5 is based on Figure 1. Transformer 14 is shown as energizing digital selector 19, which includes selectors 15, 16, and 17 of Figure 1, from terminal 40 and taps 41 through 60, and selector 19 energizes a summing bus 88 through conductors 21a, 22a, and 23a. The magnitudes of the summing resistors and of the voltages on the taps of the secondary winding are the same as in Figure 1: the portion of the winding below tap 41, including terminal 37, is not needed. Summing bus 88 is connected by conductor 124 to an amplifier 320, energized from source 36, and amplifier 320 energizes a motor 312 through a cable 321. The shaft 322 of motor 312 is shown at 322' to be continued for driving any desired load device.

Also driven by shaft 322 of motor 312 is a "velocity generator" 330. This is a dynamic transformer comprising primary and secondary windings, the former energized from source 36 and the latter energizing conductors 331 and 332, and a driven rotor. When the rotor is not in movement, no voltage from the primary winding is induced in the secondary winding: as the speed of the motor increases, a greater and greater voltage is induced in the secondary winding, the amplitude of the voltage being determined by the speed of the rotor, but its frequency being dependent only on the frequency of source 36.

Conductor 331 is connected to summing bus 88 through summing resistor 333 and conductor 333a. Conductor 332 is connected to amplifier 320. A study of Figure 5 will make it clear that the voltage supplied to amplifier 320 by selector 19 is constant for any particular punched card. When the voltage output of velocity generator 330 is exactly equal to this voltage, the amplifier input is zero and motor 312 is deenergized, thus losing speed and reducing the velocity generator output. A stable condition is reached in which the difference between the velocity generator voltage and the summing bus voltage is just sufficient to maintain motor 312 in operation at the particular speed: amplifier 320 has sufficiently high gain, and summing resistor 333 is so chosen, that the speed of motor 312 is then proportional to the voltage on summing bus 88 from selector 19.

It is thus apparent that Figure 5 discloses apparatus for controlling the speed of a motor in accordance with the digits of an abstract number.

A further feature of convenience embodied in the invention as disclosed in Figure 5 comprises resistor 350 and a single pole single throw switch 351, which are connected in series between tap 60 of secondary winding 34 and summing bus 88 by conductors 352 and 353. Resistor 350 is of the same magnitude as resistor 21 in Figure 1, and the voltage at tap 60 is 100 units, as before. Therefore, whenever switch 351 is closed, a voltage proportional to 200 units appears on summing bus 88.

This arrangement is advantageous when all the numbers to be used during a sequence of operation of the apparatus have the same initial number, such for example as occurs when all the numbers are between 200 and 299. Under these circumstances the cards need only be punched for the second and final digits of the number, the first digit being automatically supplied by means of resistor 350 and switch 351. This, of course, means that only two columns instead of three columns of a card need be punched for each number being represented, which in turn means that a great many more numbers can be included in the same amount of available card space.

*Construction and operation of Figure 6*

The control arrangements of Figures 1, 3, and 5 are all of the "proportioning" type, but my invention is equally applicable to control arrangements of the "floating" type, as is illustrated in Figure 6. In this figure an oven 375 is heated by fuel supplied through a conduit 376, under the control of a valve 377. A thermocouple 380 is inserted in oven 375, and gives a D. C. output proportional to the temperature within the oven. Figure 6 also shows a digital selector 381 energized from a D. C. source 382 through a cable 383. A D. C. amplifier 384 is energized with the output from thermocouple 380 and digital selector 381, in series, by means of conductors 385, 386, and 387, and amplifier 384 energizes a motor control amplifier 390 through conductors 391 and 392. Motor control amplifier 390 is energized through a power cable 393, and controls the operation of a reversible motor 394 through a control cable 395. The shaft 396 of motor 394 is shown as extending through suitable reduction gearing 397 to control the operation of valve 377.

It will be appreciated that the magnitudes of the voltage units in this form of the invention are quite small, because the voltage output of thermocouple 380 is small. The output of selector 381 is determined by the digits of the number represented by the card inserted into the selector, and the output of the thermocouple is determined by the temperature in the oven. Whenever these outputs are not equal and opposite, a residual voltage is impressed upon the input of amplifier 384 and acts through motor control amplifier 390 to cause operation of motor 394 to open or close valve 377 depending on whether the temperature in the oven is greater or less than that represented by the digits of the cards. The speed of motor 394, and the amount of reduction in gear train 397, are so great that any change in the setting of valve 377 occurs very slowly, so that no appreciable lag occurs between change in temperature in the oven due to change in the fuel supply, and change in the output of thermocouple 390 due to the change in temperature.

From a consideration of the foregoing disclosure it will be apparent that I have invented means for controlling a motor in accordance with signals supplied by a selector, the signals being based on an abstract numbering system rather than being coordinated in position to the position desired. I have described means for performing this function when the abstract numbers are in the decimal system, and further means for performing the same functions when the abstract numbers are in the binary system. Obviously the invention is not limited to the binary system and the decimal system, but can be adapted to any other numerical system based on a polynomial in ascending or descending powers of a common base, and with the present disclosure before them those skilled in the art will understand how to construct such an apparatus on any given base at their preference.

Numerous objects and advantages of my invention have been set forth in the foregoing disclosure, together with details of the structure and function of the apparatus, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. In a device of the class described, in combination: a member to be adjusted into any selected one of a plurality of positions serially identified by successive whole numbers in the decimal system; a voltage source having groups of taps for supplying voltages in increments of 1, 10, and 100 units, each group including not more than 10 taps; means making contact with not more than one tap in each group in accordance with the values of the digits of a selected position-identifying number; means combining the voltages supplied by the taps so contacted to comprise a control signal; a variable voltage source having a maximum voltage proportional to the largest position identifying number; motor means varying said variable source and simultaneously determining the position of said member; and means responsive to any difference between said control signal and said variable signal for causing operation of said motor means to adjust the position of said member and to vary said variable signal until it becomes equal to said control signal.

2. In a device of a class described, in combination: a member to be adjusted into any selected one of a plurality of conditions serially identified by successive whole numbers in the decimal system; a voltage source having groups of taps for supplying voltages in increments of one, ten, and one hundred units, each group including not more than ten taps; means making contact with not more than one tap in each group in accordance with the values of the digits of a selected condition identifying number; means combining the voltages supplied by the taps so contacted to comprise a control signal; a variable voltage source having a maximum voltage proportional to the largest condition identifying number; motor means varying said variable source and simultaneously determining the condition of said member; and means responsive to any difference between said control signal and said variable signal for causing operation of said motor means to adjust the condition of said member and to vary said variable signal until it becomes equal to said control signal.

3. In a device of the class described, in combination: a member to be adjusted to any selected one of a plurality of speeds serially identified by successive whole numbers in the decimal system; a voltage source having a group of taps for supplying voltages in increments of one, ten and one hundred units, each group including not more than ten taps; means making contact with not more than one tap in each group in accordance with the values of the digits of a selected speed identifying number; means combining the voltages supplied by the taps so contacted to comprise a control signal; a variable voltage source having a maximum voltage proportional to the largest speed identifying number; motor means varying said variable source and simultaneously determining the speed of said member; and means responsive to any difference between said control signal and said variable signal for causing operation of said motor means to adjust the speed of said member and to vary said variable signal until it becomes equal to said control signal.

References Cited in the file of this patent

UNITED STATES PATENTS

| | | |
|---|---|---|
| 2,443,098 | Dean | June 8, 1948 |
| 2,537,427 | Seid et al. | Jan. 9, 1951 |
| 2,576,903 | Imm | Nov. 27, 1951 |
| 2,584,809 | Oberlin | Feb. 5, 1952 |
| 2,584,897 | Marco | Feb. 5, 1952 |
| 2,630,481 | Johnson | Mar. 3, 1953 |
| 2,630,552 | Johnson | Mar. 3, 1953 |
| 2,643,355 | Hallman, Jr. | June 23, 1953 |

OTHER REFERENCES

"Electronic Industries," June 1948, pp. 12 and 13.